United States Patent [19]
Pearlstein et al.

[11] Patent Number: 6,141,456
[45] Date of Patent: Oct. 31, 2000

[54] METHODS AND APPARATUS FOR COMBINING DOWNSAMPLING AND INVERSE DISCRETE COSINE TRANSFORM OPERATIONS

[75] Inventors: Larry Pearlstein, Newtown, Pa.; Sharif M. Sazzad, North Brunswick, N.J.

[73] Assignee: Hitachi America, Ltd., Tarrytown, N.Y.

[21] Appl. No.: 09/001,700

[22] Filed: Dec. 31, 1997

[51] Int. Cl.$^7$ .............. G06K 9/36; G06K 9/46; G06K 9/32
[52] U.S. Cl. .......... 382/250; 382/277; 382/299; 382/233
[58] Field of Search .......... 382/277, 233, 382/299, 250, 232, 240; 348/403, 408, 398, 399, 441, 384, 424; 708/902; 358/433, 261.2, 261.1, 432, 525, 426, 429

[56] References Cited

U.S. PATENT DOCUMENTS

| | | | |
|---|---|---|---|
| 4,238,773 | 12/1980 | Tsuboka et al. | 358/183 |
| 4,931,879 | 6/1990 | Koga et al. | 358/335 |
| 5,091,785 | 2/1992 | Canfield et al. | 358/183 |
| 5,202,847 | 4/1993 | Bolton et al. | 364/725 |
| 5,237,460 | 8/1993 | Miller et al. | 360/8 |
| 5,262,854 | 11/1993 | Ng | 358/133 |
| 5,313,303 | 5/1994 | Ersoz et al. | 348/439 |
| 5,325,124 | 6/1994 | Keith | 348/391 |
| 5,325,125 | 6/1994 | Naimpally et al. | 348/402 |
| 5,325,126 | 6/1994 | Keith | 348/418 |
| 5,335,117 | 8/1994 | Park et al. | 360/48 |
| 5,367,318 | 11/1994 | Beaudin et al. | 345/201 |
| 5,386,241 | 1/1995 | Park | 348/565 |
| 5,390,052 | 2/1995 | Kato et al. | 360/32 |
| 5,398,072 | 3/1995 | Auld | 348/426 |
| 5,408,270 | 4/1995 | Lim | 348/429 |
| 5,422,677 | 6/1995 | Do | 348/568 |
| 5,467,131 | 11/1995 | Bhaskaran et al. | 348/384 |
| 5,471,412 | 11/1995 | Shyu | 364/725 |
| 5,477,397 | 12/1995 | Naimpally et al. | 360/10.3 |
| 5,479,364 | 12/1995 | Jones et al. | 364/725 |
| 5,483,475 | 1/1996 | Kao | 364/725 |
| 5,649,077 | 7/1997 | On et al. | 395/119 |
| 5,845,015 | 12/1998 | Martucci | 382/250 |

FOREIGN PATENT DOCUMENTS

| | | | |
|---|---|---|---|
| 0 786 902 | 7/1997 | European Pat. Off. | H04N 7/30 |
| WO 95/15538 | 6/1995 | WIPO | G06T 3/40 |

OTHER PUBLICATIONS

Ram Prabhakar, "DCE Scaling Enables Universal MPEG Decoder", EDN, Jun. 6, 1996, pp. 147–150.

(List continued on next page.)

*Primary Examiner*—Jose L. Couso
*Assistant Examiner*—Shawn B. Cage
*Attorney, Agent, or Firm*—Straub & Pokotylo; Michael P. Straub

[57] ABSTRACT

Methods and apparatus for combining linear image post-processing operations with an inverse discrete cosine transform (IDCT) operation are described. In accordance with various embodiments of the present invention IDCT and downsampling operations are combined into a single operation to achieve the same image processing result as sequential IDCT and downsampling operations. By combining the two operations and performing downsampling in the DCT, as opposed to pixel domain, significant complexity reduction is achieved over embodiments where the two operations are performed sequentially. In one particular embodiment, when interlaced images are being processed, combined IDCT/downsampling circuits which perform field based, as opposed to frame based, downsampling in the DCT domain are employed. The method and apparatus of the present invention can be used to implement circuits which perform a combined full order IDCT/downsampling operation and/or a reduced complexity combined full order IDCT/downsampling operation. The combined IDCT/downsampling methods and apparatus of the present invention are capable of supporting a wide range of downsampling ratios using, at least in some cases, fewer math operators, than are required to implement zonal filtering followed by a reduced order IDCT operation which requires the use of a contiguous subblock of DCT coefficients.

21 Claims, 9 Drawing Sheets

OTHER PUBLICATIONS

Balas K. Natarajan et al, "A Fast Approximate Algorithm for Scaling Down Digital Images in the DCT Domain", 1995 *IEEE*, Oct. 23, 1995, pp. 241–243.

King N. Ngan, "Experiments on Two–Dimensional Decimation in Time and Orthogonal Transform Domains" Department of Electrical Engineering, National University of Singapore, pp. 249–263, Jul., 1985.

Kou–Hu Tzou, Ting–Chung Chen, Paul E. Fleischer, and Ming L. Liou, "Compatible HDTV Coding for Broadband ISDN" Bell Communications Research, pp. 0743–0749, IEEE Journal 1988.

Christoph Loeffler*, Adriaan Ligtenbert**, and George S. Moschytz*, "Practical Fast 1–D DCT Algorithms With 11 Multiplications" * Institute for Signal and Information Processing, and **AT&T Bell Laboratories, pp. 988–991, IEEE Journal 1989.

K.R. Rao and P.Yip, "Discrete Cosine Transform Algorithms, Advantages, Applications", Academic Press, Inc., San Diego, CA, 1990.

A.Hoffmann, B.Macq, and J. J. Quisquater, "Future Prospects of the Cable TV Networks, New Technologies and New Services", Laboratoire de Télécommunications et Télédétection, pp. 13–22, Aug., 1993.

International Standards Organization—Moving Picture Experts Group, Draft of Recommendation ITU–TH.262, ISO/IEC 13818–2 titled "Information Technology—Generic Coding of Moving Pictures and Associated Audio Information: Video", Nov. 9, 1994.

International Standards Organization—Moving Picture Experts Group, Draft of Recommendation H.222.0, ISO/IEC 13818–1 titled "Information Technology—Generic Coding of Moving Pictures and Associated Audio: Systems", Nov. 13, 1994.

Dong–Ho Lee, Jong–Seok Park, and Ying–Gil Kim, "HDTV Video Decoder Which Can be Implemented With Low Complexity", p. 6, IEEE Journal 1994.

PRIOR ART

|  | C1 | C2 | C3 | C4 | C5 | C6 | C7 | C8 |
|---|---|---|---|---|---|---|---|---|
| R1 | X | X | X | X | X | X | X | X |
| R2 | X | X | X | X | X | X | X | X |
| R3 | X | X | X | X | X | X | X | X |
| R4 | X | X | X | X | X | X | X | X |
| R5 | X | X | X | X | X | X | X | X |
| R6 | X | X | X | X | X | X | X | X |
| R7 | X | X | X | X | X | X | X | X |
| R8 | X | X | X | X | X | X | X | X |

FIG. 1A

PRIOR ART

|  | C1 | C2 | C3 | C4 | C5 | C6 | C7 | C8 |
|---|---|---|---|---|---|---|---|---|
| R1 | X | X | X | X | X | X | X | X |
| R2 | X | X | X | X | X | X | X | X |
| R3 | X | X | X | X | X | X | X | X |
| R4 | X | X | X | X | X | X | X | X |
| R5 | X | X | X | X | X | X | X | X |
| R6 | X | X | X | X | X | X | X | X |
| R7 | X | X | X | X | X | X | X | X |
| R8 | X | X | X | X | X | X | X | X |

FIG. 1B

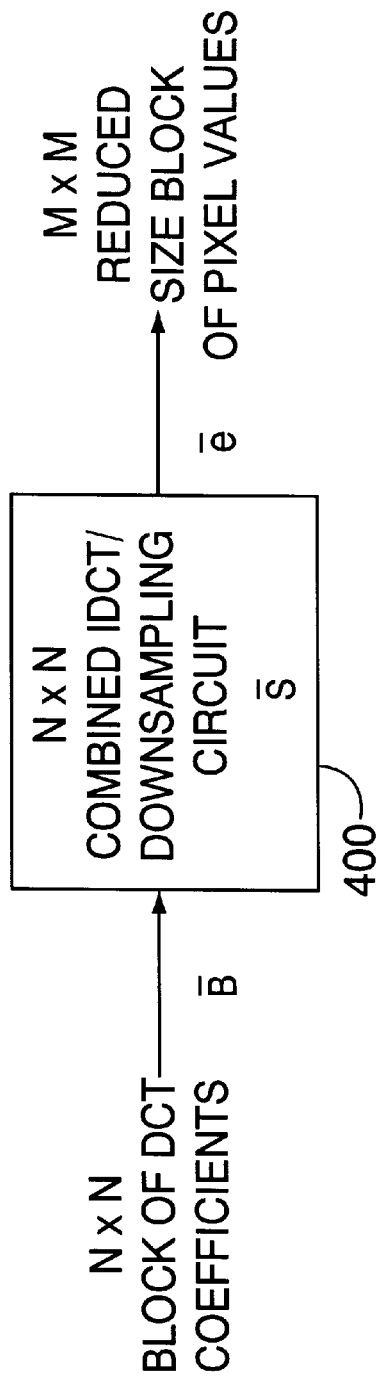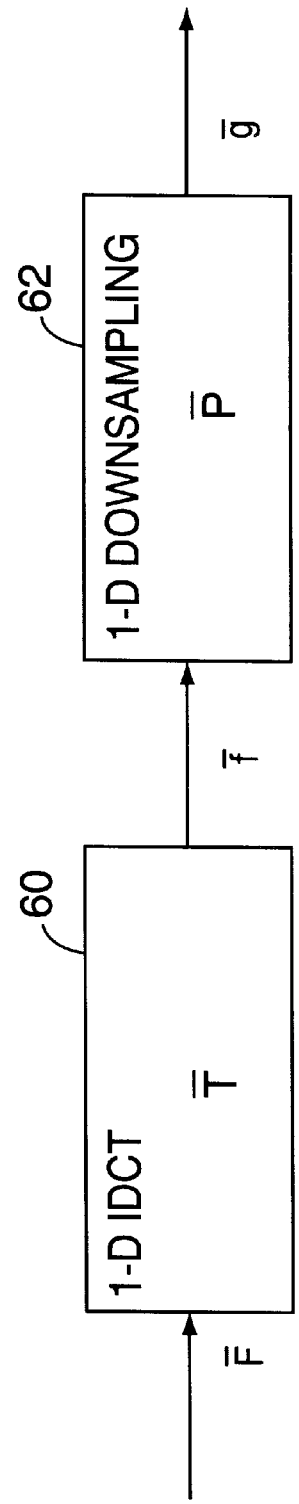

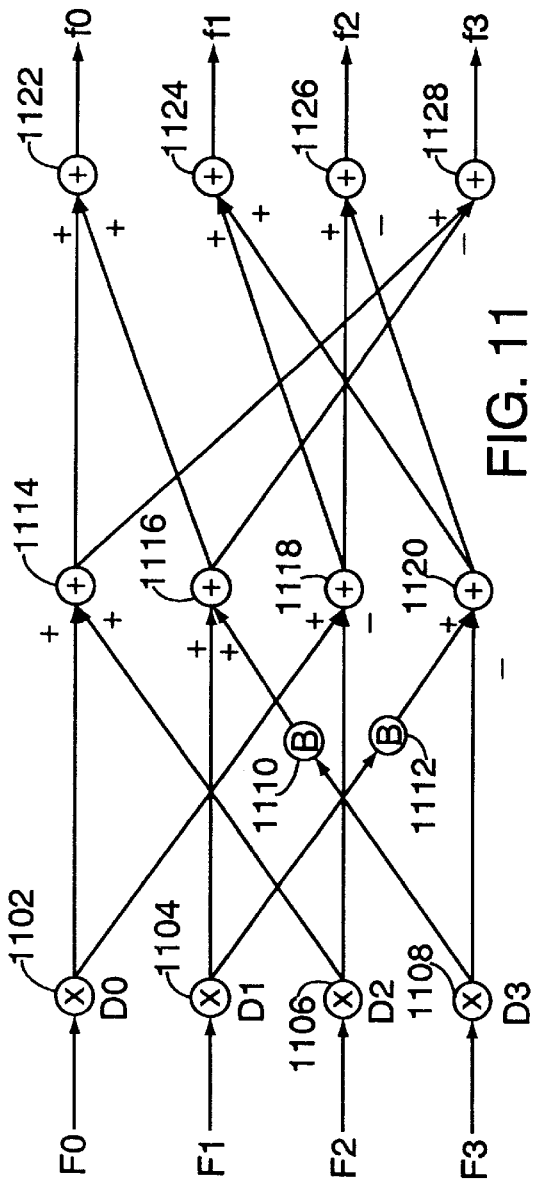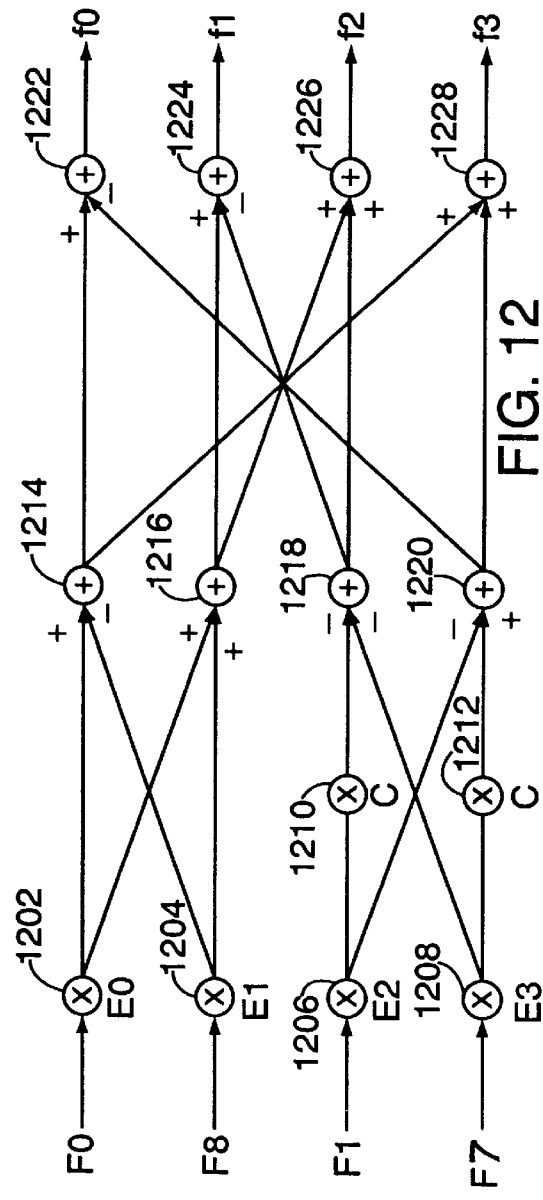

ly referred to as the MPEG-II
METHODS AND APPARATUS FOR COMBINING DOWNSAMPLING AND INVERSE DISCRETE COSINE TRANSFORM OPERATIONS

FIELD OF THE INVENTION

The present invention relates to methods and apparatus for processing transform coded data and, more specifically, for combining inverse transform operations with other types of linear operations such as downsampling operations.

BACKGROUND OF THE INVENTION

Various digital applications, such as digital video, involve the processing, storage, and transmission of relatively large amounts of digital data. To reduce the amount of digital data that must be stored and transmitted in conjunction with digital applications, various digital coding techniques, e.g., transform encoding techniques, have been developed. Discrete cosine transform (DCT) encoding is a particularly common form of transform encoding.

One text dedicated to a discussion of DCT encoding and its use is K. R. Rao, P. Yip, *Discrete Cosine Transform Algorithms, Advantages, Applications*, Academic Press, Inc. (1990) (hereinafter referred to as "the K. Rao and P. Yip reference").

DCT encoding is finding widespread use in the field of digital signal processing and digital image coding in particular. In fact, at least one standard proposed for the coding of motion pictures, commonly referred to as the MPEG-II standard, described in [1] ISO/IEC 13818-2 (1994) Generic Coding of Moving Picture and Associated Audio Information: Video (hereinafter referred to as the "MPEG-2" reference), relies heavily on the use of DCT coding.

When using DCT encoding in the image signal processing context, a DCT encoding operation is performed on digital data representing an image. This is usually done prior to storage or transmission to thereby reduce data storage and/or transmission requirements. A DCT image encoding operation results in what is frequently referred to as a block of DCT coefficients. One commonly used block size is an 8×8 block of DCT coefficients. In such embodiments, the 8×8 block of DCT coefficients is frequently used to represent a corresponding block of 64 image pixels. FIG. 1A illustrates an 8×8 block of DCT coefficients comprising 8 rows (R1–R8) and 8 columns (C1–C8) of DCT coefficients, where each coefficient is represented by an X.

Prior to displaying an image represented by a block of DCT coefficients, an inverse discrete cosine transform (IDCT) operation is normally performed to restore the image data into a format that is suitable for display and/or additional processing. For example, an IDCT operation is normally used to transform image data in the DCT domain, e.g., a block of DCT coefficient values, into data in the pixel domain, e.g., a block of pixel values.

Known IDCT circuits may be characterized as full order IDCT circuits, full order reduced complexity IDCT circuits, or reduced order IDCT circuits.

A full order IDCT circuit performs an IDCT operation on a block of DCT coefficients having the same a number of DCT coefficient values as the original DCT coefficient blocks generated at encoding time. For example, if a DCT encoding operation produced 8×8 blocks of DCT coefficients, a full order IDCT operation would involve performing an 8×8 IDCT operation.

Full order reduced complexity IDCT circuits force one or more of the DCT coefficients being processed to assume a value of zero, or treat one or more DCT coefficients of a block of DCT coefficients being processed as having a value of zero. This allows various computational simplifications to be made allowing for a full order reduced complexity IDCT circuit to be implemented with fewer multiplications than a regular full order IDCT. Such an IDCT processing approach is discussed in U.S. Pat. No. 5,635,985, which is assigned to the same assignee as the present application, and which is hereby expressly incorporated by reference. Such an IDCT operation is characterized as a reduced complexity full order IDCT operation because the IDCT calculation is based on a DCT coefficient block of the same size as the input to a full order IDCT circuit, but requires fewer computations to perform than a normal full order IDCT operation since some of the DCT values are treated as zero.

As the name implies, reduced order IDCT circuits perform reduced, as opposed to full order, IDCT operations. A reduced order IDCT operation involves performing an IDCT operation using a DCT block size which is smaller than the block size generated at DCT encoding time. The reduction in DCT block size may be achieved by using a zonal filter to select a subblock of DCT coefficients to be used when performing the IDCT operation. For example, if a DCT encoding operation produced an 8×8 block of DCT coefficients, a reduced order IDCT operation would involve performing an IDCT operation on, e.g., a 4×4 subblock of DCT coefficients selected from a larger 8×8 block. The remaining 48 DCT coefficients of the 8×8 block are not used in the IDCT operation. FIG. 1B illustrates an 8×8 block of DCT coefficients from which the 4×4 block of coefficients located in the upper left hand corner have been selected for use when performing a reduced order IDCT operation.

IDCT operations and various other digital image processing operations generally involve performing a substantial number of multiplication and/or addition operations. These operations are performed to, e.g., implement a data matrix manipulation operation required to perform the desired IDCT or image processing operation.

In many applications transform encoded images are received, decoded by performing an IDCT operation, and displayed in real time. For real time video, IDCT operations must be performed in a time period that is equal to, or less than, the time used to display the image represented by the transform coded data being decoded. In many cases, to achieve real time video processing, the large amount of data and the large number of multiplications and additions which must be performed in a relatively short amount of time, requires the use of fast and relatively expensive IDCT circuits.

Prior to display, in addition to an IDCT operation, image processing operations such as downsampling may be performed. Downsampling is generally used to refer to a video data reduction operation that results in some reduction in image resolution.

Operations performed on DCT coded data prior to fully completing an IDCT operation are normally referred to as being performed in the DCT domain. Operations performed on video data after completion of an IDCT operation are generally referred to as being performed in the pixel domain. Various video processing operations tend to be easier to implement in the pixel domain. For this reason, many video processing operations are performed subsequent to completion of an IDCT operation.

A known full order IDCT circuit 20 followed by a downsampling circuit 22 is illustrated in FIG. 2A. Note that the input to the full order IDCT circuit 20 is an N×N block of DCT coefficients, e.g., the 8×8 block of DCT coefficients illustrated in FIG. 1. The output of the full order IDCT circuit 22 is an N×N block of pixel values, i.e., a block of pixel values which is the same size as the input block of coefficient values. The downsampling circuit 22 performs a low pass filtering and decimation operation on the N×N block of pixel values input thereto to generate a reduced size block of pixel values. For example, assuming that the input to the IDCT circuit 22 was an 8×8 block of DCT coefficients and the downsampling circuit 22 performed decimation by a factor of 2 in both the horizontal and vertical directions, the output of the downsampling circuit 22 would be a 4×4 block of pixel values.

When separate additional processing operations, such as downsampling, are performed on digital image data in conjunction with an IDCT operation, the number of math operations that must be performed on a digital image prior to its display is increased beyond the already high number involved in performing the IDCT operation alone. In the context of real time image processing this can result in the use of additional, relatively expensive operators in addition to those already required to perform an IDCT operation.

Generally, images represented by transform coded data may be interlaced or non-interlaced. Interlaced images are formed from a composite of two different images or fields with, e.g., even lines corresponding to a first image and odd lines corresponding to a second image. FIG. 1C illustrates an interlaced image 110 which comprises the combination of a first image 102 and a second image 103. Note that the even lines of pixels R0, R2, R4 and R6 of image 110 are from the first image 102 while the odd lines of pixels R1, R3, R5, and R7 are from the second image 103. In the case where the images correspond to a motion sequence, the first and second images 102, 103 will be different. The combining or averaging of pixel values from different fields of an interlaced image as part of a low pass filtering operation, e.g., during downsampling, can result in distortions being introduced into the image. This is because the averaging involves combining pixel values from two distinct images. In the case of non-interlaced images, where all the pixels of an image correspond to a single image, this problem does not occur. As will be discussed below, one embodiment of the present invention addresses the above discussed problem associated with performing downsampling on interlaced video images.

While being a very different operation from performing a full order IDCT operation followed by downsampling, performing a zonal filtering operation on a block of DCT coefficients followed by a reduced order IDCT operation can provide visual results which are similar to the combination of performing a full order IDCT with downsampling.

FIG. 3 illustrates the use of a zonal filter 32 followed by a reduced order IDCT circuit 34. The zonal filter 32 discards all but a selected sub-block of DCT coefficients, e.g., a 4×4 block of coefficients, from the larger N×N, e.g., 8×8 block of coefficients input thereto. Assuming that the block of input DCT coefficients corresponds to the 8×8 block of coefficients illustrated in FIG. 1B, the zonal filter would discard all but the sub-block of coefficients in the upper left hand corner of the input block of coefficients. The retained transform coefficients are supplied to the input of a reduced order, e.g., N/2×N/2 IDCT circuit 34. The reduced order IDCT circuit 34 generates a block of pixel values equal to the number of DCT coefficients input thereto. The use of a system of the type illustrated in FIG. 3 is described at page 143 of the *K. Rao and P. Yip* reference.

Because the approach illustrated in FIG. 3 involves only the selection of a sub-block of received DCT coefficients to process and the performing of an IDCT operation only on the limited number of coefficients included in the selected sub-block, it can be implemented using fewer math operators than the combination of a full order IDCT circuit followed by a downsampling circuit as illustrated in FIG. 2.

Unfortunately, the downsampling ratio's which can be achieved using reduced order IDCTs are somewhat limited. In some cases, e.g., in the case of interlaced images which comprise two distinct fields, the use of reduced order IDCTs may result in an undesirable degradation in the quality of a decoded video image generated from the interlaced video data processed by a reduced order IDCT circuit. It should also be noted that the reduced order IDCT is, in general, mathematically different from the downsampled full order IDCT applied to zonally filtered DCT coefficients.

In view of the above, it becomes apparent that there is a need for improved methods and apparatus for implementing IDCT operations particularly in combination with other image processing operations. It is desirable that any new methods require fewer, and/or simpler to implement, math operations than performing a separate full order IDCT operation in conjunction with an additional image processing operation. In the case of IDCT and downsampling operations in particular, it is desirable that a wide range of downsampling ratios be supported and that the DCT coefficients used as part of the operation need not be limited to a contiguous sub-block of a larger set of DCT coefficients representing the image being processed.

In order to provide for maximum image quality, it is also desirable, particularly when processing interlaced images, that portions of an image corresponding to different fields of an interlaced image be capable of being downsampled on a field as opposed to a frame basis.

SUMMARY OF THE PRESENT INVENTION

The present invention relates to methods and apparatus for processing transform coded data and, more specifically, for combining inverse transform operations with other types of linear operations, e.g., a downsampling operation. In accordance with the present invention, linear image processing operations that are combined with an IDCT operation are performed in the DCT as opposed to the pixel domain. That is, the combined operations are performed prior to the generation of a complete set of pixel data from a set of DCT coefficients.

Various features of the present invention relate to the downsampling video images in the DCT domain in conjunction with performing an IDCT operation. In various specific embodiments of the present invention, downsampling involving both a low pass filtering operation and a decimation operation, is performed on image data in the DCT domain.

In accordance with different embodiments of the present invention, downsampling of interlaced and non-interlaced images is performed differently, e.g., downsampling is performed in the DCT domain on the separate fields of an interlaced image as opposed to being performed directly on the entire image without regard to the fields to which particular pixels belong.

By combining an IDCT operation with one or more additional video operations normally performed in the pixel domain subsequent to performing an IDCT operation, the present invention achieves implementation efficiencies over known implementations which perform the IDCT and other video processing operations sequentially. Thus, the combining of two distinct image processing operations in accordance with the present invention into a single operation performed in the DCT domain, provides both implementation and cost benefits.

In addition to implementation efficiency, the methods and apparatus of the present invention have the advantage of supporting a wide range of downsampling ratios including those which can not be achieved using reduced order IDCT circuits. Furthermore, because the methods and apparatus of the present invention can be used to perform full order IDCT operations or reduced complexity full order IDCT operations in conjunction with other operations, the advantages of full order and reduced complexity full order IDCT operations can be maintained while obtaining the implementation advantages of the present invention.

In addition to the above described embodiments and features, numerous additional features, embodiments and advantages of the methods and apparatus of the present invention are discussed below.

BRIEF DESCRIPTION OF THE DRAWINGS

FIG. 1A illustrates an 8×8 block of DCT coefficients.

FIG. 1B illustrates an 8×8 block of DCT coefficients with a sub-block of 4×4 DCT coefficients selected for use by a reduced order IDCT circuit.

FIG. 4 illustrates a 2-D (dimensional) combined IDCT/downsampling circuit implemented in accordance with one embodiment of the present invention.

FIG. 6 illustrates a 1-D IDCT circuit followed by a 1-D downsampling circuit.

FIG. 11 is a flow diagram for a 1-D combined IDCT/downsampling operation performed on a non-interlaced video image in accordance with one embodiment of the present invention.

FIG. 12 is a flow diagram for a 1-D combined IDCT/downsampling operation performed on an interlaced video image in accordance with another embodiment of the present invention.

DETAILED DESCRIPTION

Figure 1C:
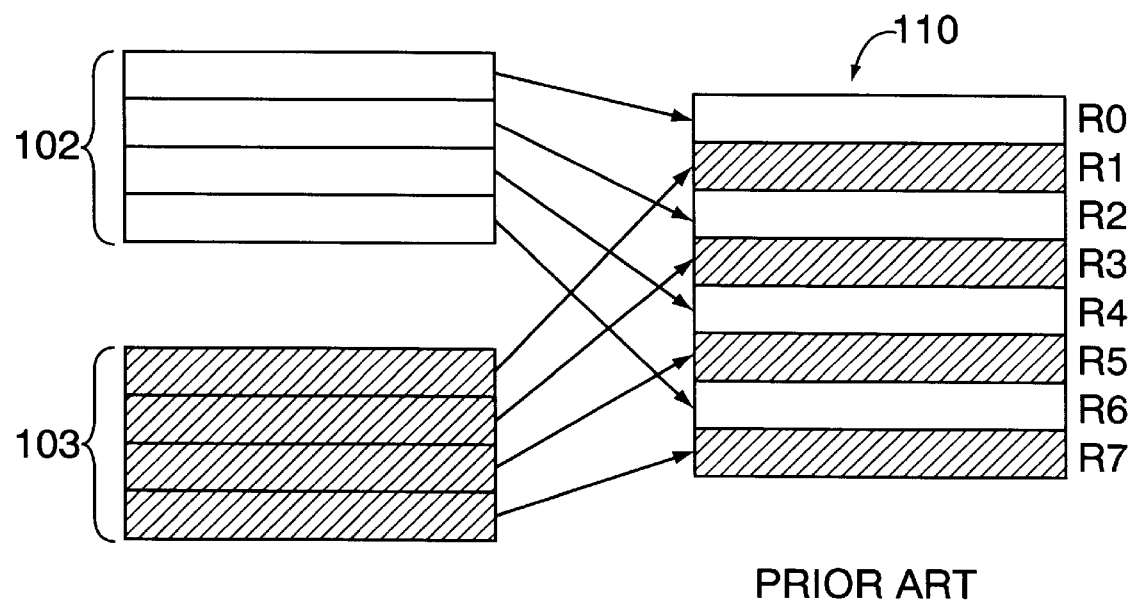
FIG. 1C illustrates an interlaced image and the fields which make up the interlaced image.
Figure 2:
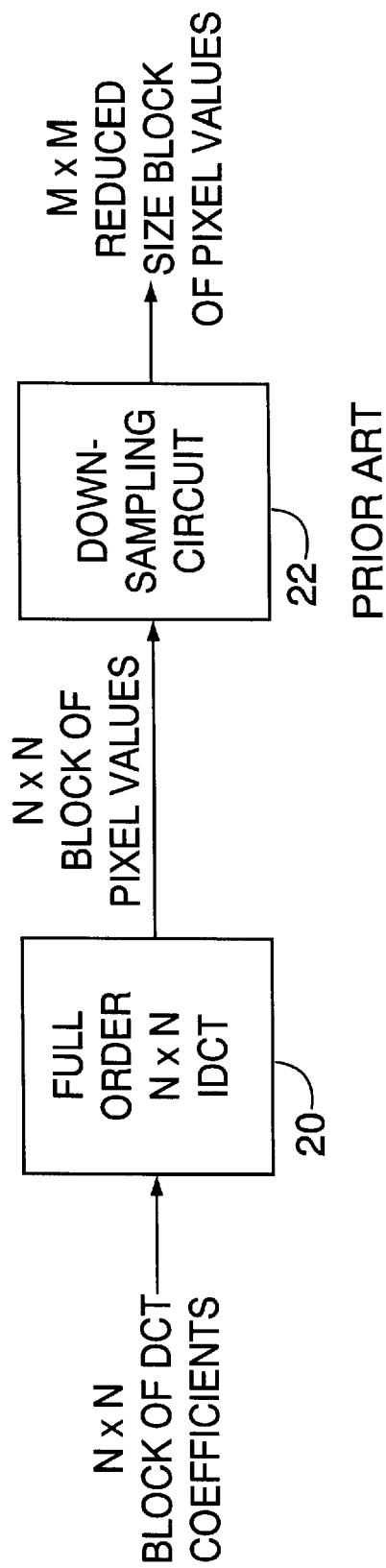
FIG. 2 illustrates a known circuit including an full order IDCT circuit followed by a downsampling circuit.
Figure 3:
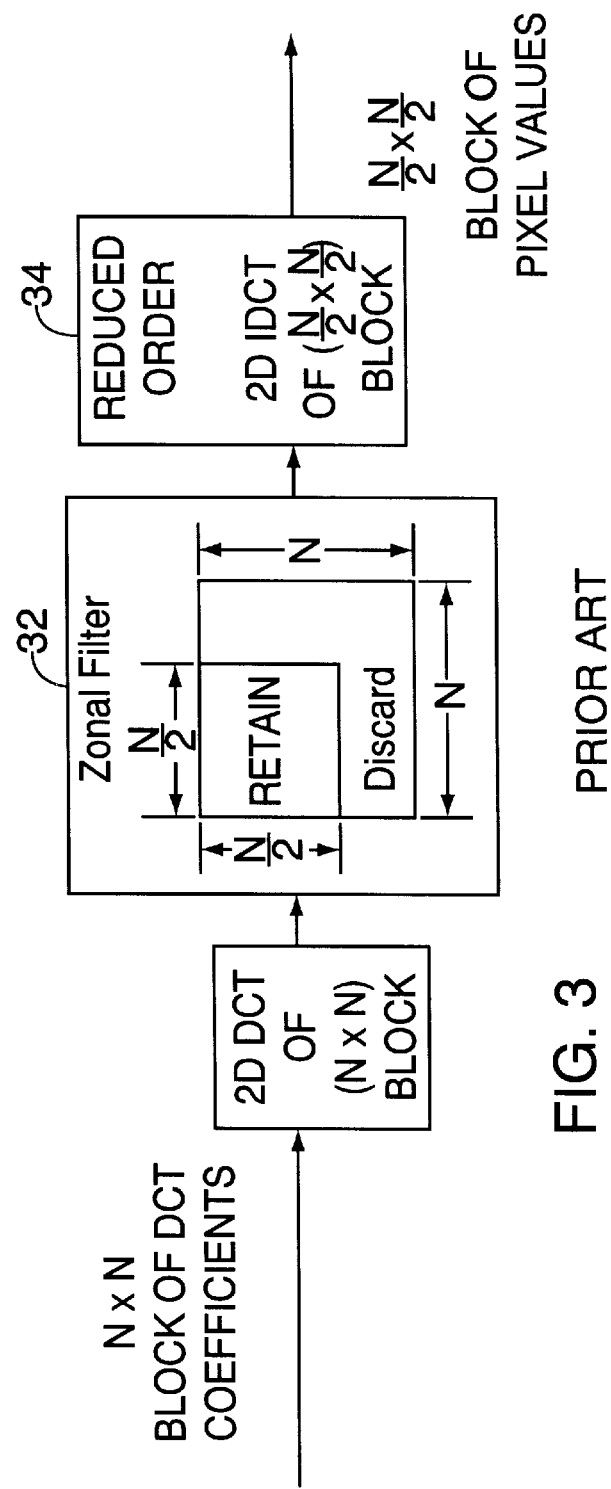
FIG. 3 illustrates a known circuit for selecting a sub-block of DCT coefficients from an N×N block of coefficients and for performing a reduced order IDCT operation on the selected sub-block of coefficients.

As discussed above, the present invention relates to methods and apparatus for processing transform coded data and, more specifically, for combining inverse transform operations with other types of linear operations, e.g., a downsampling operation. In accordance with the present invention, linear image processing operations that are combined with an IDCT operation are performed in the DCT as opposed to the pixel domain. That is, the combined operations are performed prior to the generation of a complete set of pixel data from a set of DCT coefficients.

Accordingly, various features of the present invention relate to the downsampling video images in the DCT domain in conjunction with performing an IDCT operation. In accordance with different embodiments of the present invention, downsampling of interlaced and non-interlaced images is performed differently, e.g., downsampling is performed in the DCT domain on the separate fields of an interlaced image as opposed to being performed directly on the entire image without regard to the fields to which particular pixels belong.

By combining an IDCT operation with one or more additional video operations normally performed in the pixel domain subsequent to performing an IDCT operation, the present invention achieves implementation efficiencies over known implementations which perform the IDCT and other video processing operations sequentially. Thus, the combining of two distinct image processing operations in accordance with the present invention into a single operation performed in the DCT domain, provides both implementation and cost benefits.

In addition to implementation efficiency, the methods and apparatus of the present invention have the advantage of supporting a wide range of downsampling ratios including those which can not be achieved using reduced order IDCT circuit. Furthermore, because the methods and apparatus of the present invention can be used to perform full order IDCT operations or reduced complexity full order IDCT operations in conjunction with other operations, the advantages of full order and reduced complexity full order IDCT operations can be maintained while obtaining the implementation advantages of the present invention.

Referring now to FIG. 4, there is illustrated a representative two dimensional full order combined IDCT/downsampling circuit 400 implemented in accordance with one embodiment of the present invention. The circuit 400 receives as its input an N×N block of DCT coefficients B. By performing a combined 2-D IDCT/downsampling operation represented as the function S on the DCT coefficients in the DCT domain an M×M block of pixel values e is generated, where M<N is generated. It should be noted that in the FIG. 4 example, the amount of downsampling performed in both the horizontal and vertical directions is the same. However, different amounts of downsampling can be applied in the vertical and horizontal directions or downsampling can be applied to only one of the two directions. Operation of the combined IDCT/downsampling circuit 400 will be discussed in greater detail below.

The combined IDCT/downsampling circuit of the present invention can be used in a wide variety of image processing devices including, for example, video decoders which decode HD and SD television signals and/or video decoders which decode video signals at reduced resolutions relative to the resolution at which the video images are encoded.

Figure 5:
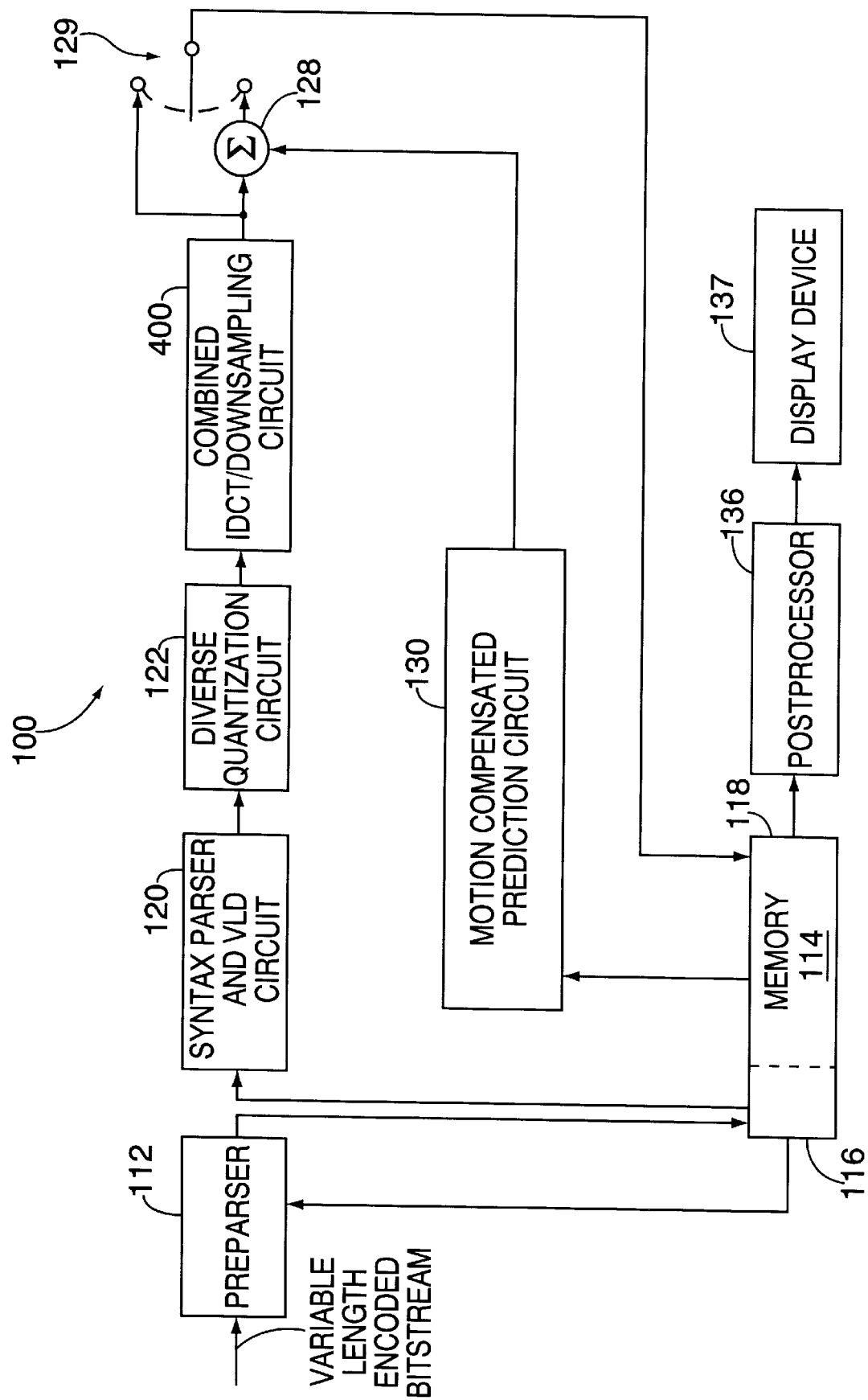
FIG. 5 illustrates a video decoder using the combined IDCT/downsampling circuit of the present invention illustrated in FIG. 4.

Referring now to FIG. 5, there is illustrated a video system 100 implemented in accordance with one embodiment of the present invention for decoding and displaying video images encoded using DCT and variable length encoding techniques. The system 100 comprises an optional preparser 112, a memory 118, a syntax parser and variable length decoder (VLD) circuit 120, Inverse Quantization Circuit 122, combined IDCT/Downsampling circuit 400, switch 129, summer 128 motion compensated prediction circuit 130, postprocesor 136 and display device 137. The memory 112 includes a channel buffer 116 for storing variable length encoded data and a frame buffer for storing decoded video data for use, e.g., as reference data when performing motion compensated predictions. The various circuits are coupled together as illustrated in FIG. 5. The majority of the components illustrated in FIG. 5 are the same as or similar to those discussed in detail in U.S. Pat. No. 5,635,985 and will not be discussed at length herein. Note however, that the video system 100 of the present invention uses the combined IDCT/downsampling circuit 400 of the present invention to perform both an IDCT and downsampling operation, using a single circuit, in a manner that is more efficient than using separate sequential IDCT and downsampling circuits.

Implementation and operation of the 2 dimensional combined IDCT and downsampling circuit 400 of the present invention will now be explained with reference to FIGS. 4–12.

As will be discussed at length below, in accordance with one embodiment of the present invention, a two dimensional (2-D) combined IDCT/downsampling circuit 400 is implemented using one or more 1-D combined IDCT/downsampling circuits such as the circuits 700, 800 illustrated in FIGS. 7 and 8, respectively.

Each 1-D combined IDCT downsampling circuit performs a function which is mathematically equivalent to the function performed by the combination of a 1-D IDCT circuit followed by a 1-D downsampling circuit of the type illustrated in FIG. 6.

As illustrated in FIG. 6, the block of DCT coefficients input to a one dimensional IDCT circuit 60 may be represented as the vector F while the operation performed by the one dimensional IDCT circuit 60 can be represented as the function T. The output of the IDCT circuit 60, represented as f, is a set of inverse transformed values and represents the application of the function T to the input vector F. That is, the output of the 1-D IDCT circuit can be expressed as follows:

$$f = TF$$

The subsequent application of downsampling to the result of the IDCT operation 21 can be expressed as performing a linear post-processing function P, performed in the pixel domain, to the set of pixel values, represented by the vector f to produce a new set of pixel values represented by the vector g. That is, $$g = Pf$$

As discussed above, the present invention recognizes that implementation efficiencies can be achieved by combining an IDCT operation with a subsequent linear post processing operation.

That is, the present invention recognizes that the same result g can be achieved by processing a set of DCT coefficients F by using a single operator S, selected in accordance with the present invention to be more efficient that the serial application of the two distinct operators T and P.

That is $$g = FS = Pf = (PT)F$$

Because the IDCT and postprocessor operators T and P are linear, as will be discussed below, factorization can be used to produce the combined IDCT/post processing function S. Using appropriate factorization, that is, factorization as taught in the present application, significant savings can be achieved in implementing S as opposed to the two distinct serial operators P and T.

As discussed above, various embodiments of the present invention are directed to combining a conventional full order IDCT operation, where all the DCT coefficients in an input block are processed, with another linear processing operation such as downsampling. The techniques of the present invention can also be applied to combining a full order reduced complexity IDCT operation, where one or more DCT coefficients in an input block of coefficients are forced to, or treated as, zero, with an additional post processing operation such as downsampling.

By combining a full order reduced complexity full order IDCT operation with a downsampling operation, it is possible to implement a single circuit capable of performing an IDCT and downsampling operation using even fewer mathematical operators (multipliers and adders) then are required to implement a combined full order IDCT/downsampling circuit.

Figure 7:
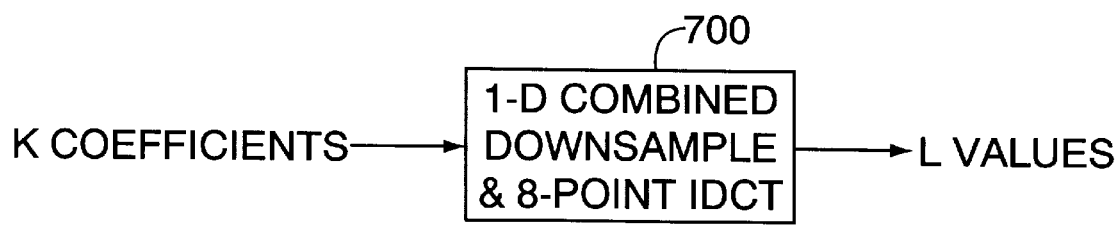
FIGS. 7 and 8 illustrate full order one dimensional combined IDCT/downsampling circuits implemented in accordance with various embodiments of the present invention.
Figure 8:
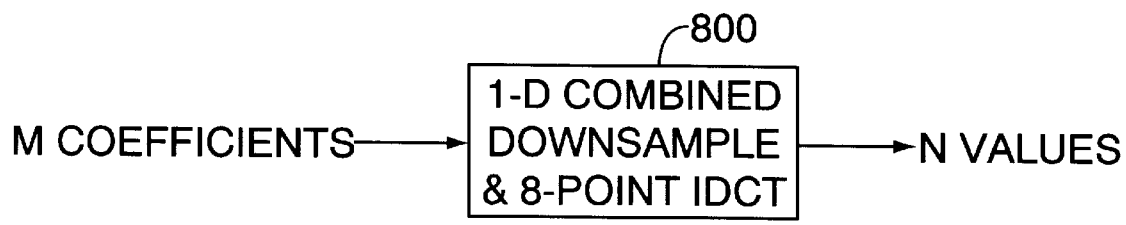

In order to implement a 2-D combined IDCT/downsampling circuit 400, the present invention uses 1-D combined downsampling/IDCT circuits such as those illustrated in FIGS. 7 and 8 as basic building blocks.

FIG. 7 illustrates a circuit 700 for performing a 1-D combined downsampling and 8 point IDCT operation. The circuit 700 is suitable for processing a 1-D row or column of DCT values. A plurality of such circuits can be used, e.g., one per row or column, to implement the 2-D circuit 400. The 1-D combined 8-point IDCT/downsampling circuit 700 receives as its input K DCT coefficients and outputs L values. When implemented to perform a full order IDCT operation, the circuit 700 will receive 8 coefficients as its input and generate L values as it output. In this context, L is a function of the downsampling ratio applied by the circuit 700. For example, when downsampling by a factor of 2 is applied, L will equal 4.

In the case where the circuit 700 implements an 8-point reduced complexity IDCT operation all of the 8 coefficients of, e.g., a row or column of a block of DCT coefficients being processed, need not be input to the circuit 700. In such a reduced complexity IDCT/downsampling embodiment, DCT coefficients which are not supplied to the circuit 700 are treated as zero for computational purposes.

The 1-D combined IDCT/downsampling circuit 800 is similar to the circuit 700 but receives as its input M coefficients and generates N values. The M coefficients will equal 8 in the case of a full order 8 point IDCT and can be less than 8 in the case of a reduced complexity full order IDCT circuit. As in the case of the circuit 700, the number of values N output by the circuit 700 is a function of the downsampling performed. For example, if downsampling by a factor of 4 is applied, N will equal 2.

In order to implement a two dimensional combined IDCT/downsampling circuit which implements different downsampling in the vertical and horizontal directions, at least two different 1-D combined IDCT/downsampling circuits are used. One to processes the rows and one to process the columns as will be discussed below. The order in which rows and columns of DCT coefficients are processed in accordance with the present invention to generate pixel values can be interchanged.

Figure 9:
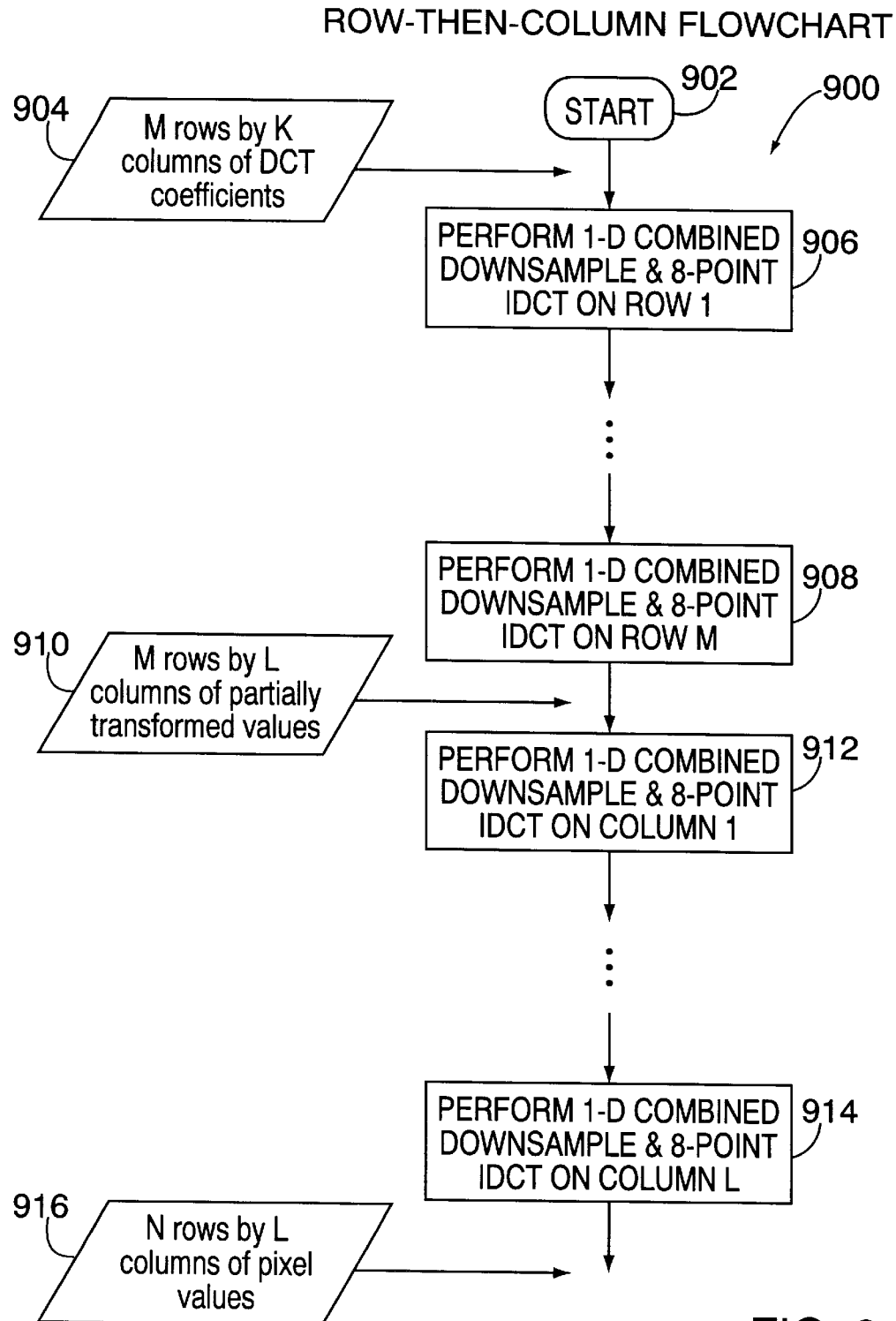
FIGS. 9 and 10 illustrate methods of using the one dimensional combined IDCT/downsampling circuits of the present invention to implement a full order 2 dimensional IDCT/downsampling operation.

FIG. 9 illustrates a method 900 of the present invention for implementing a 2-D combined full order IDCT/downsampling operation by performing row then column processing using the 1-D combined 8 point IDCT/downsampling circuits 700, 800 of the present invention.

The method 900 begins in step 902. In step 902 a block of B×H DCT coefficients to be processed is received and separated into M rows of K DCT coefficients per row. M may be equal to or less than B. Similarly, K may be equal to or less than H as discussed below. In accordance with the present invention, in the FIG. 9 embodiment, each row of DCT coefficients is processed, e.g., by the circuit 700, to generate a set of intermediate values.

The M×K set of DCT coefficients that are used 904 (not treated as zero) are identified and divided into individual rows for processing as part of step 1002. In the case where the combined IDCT/downsampling circuits 700, 800 perform a full order IDCT operation all the coefficients in the received block of coefficients will be used. In such a case, if an 8×8 block of DCT coefficients is being processed, M and K will both equal 8.

In the case where the combined IDCT/downsampling circuits 700, 800 perform reduced complexity IDCT operations, some of the DCT coefficients in the received block of coefficients are treated as zero. Accordingly, in the case where circuits 700, 800 are reduced complexity combined IDCT/downsampling circuits, some of the coefficients in the rows and columns in the received block of B×H coefficients may be treated as zero. In such a case, M the number of coefficients used in each column and K, the number of coefficients used in each row, will be less than B the number of received coefficients in each column and H the number of received coefficients included in each row. that is, M and K will be less than B and H, respectively.

In accordance with the present invention a separate 1-D combined IDCT/downsampling circuit 700 may be used to process each one of the M rows of K DCT coefficients. Alternatively a single 1-D combined IDCT/downsampling circuit 700 may be used repeatedly to process each one of the M rows of K DCT coefficients.

Block 904 represents the M rows of K DCT coefficients which are to be processed using the 1-D circuit 700. Each of the steps 906–908 correspond to the processing of one of the M rows of K DCT coefficients using the 1-D combined IDCT/downsampling circuit 700 implemented in accordance with the present invention. Note that for each one of the M rows of IDCT coefficients L values, e.g., intermediate values, are generated. The group of M×L intermediate values generated in steps 906–908 are represented as block 910. As discussed above, the number L of values generated for each row by the circuit 700 is a function of the downsampling performed by the circuit 700. For example, in the case of downsampling by a factor of 2, (L=8/2), 4 intermediate values will be generated for each row.

Each one of the generated L columns of intermediate values, including M values per column, of block 910 are processed using the 1-D combined downsampling/IDCT circuit 800 to complete the 2-D IDCT/downsampling process in steps 912, 914. Each one of the L columns of intermediate values is separately processed by the circuit 800 to produce a set of N pixel values. In this case, N is a function of the downsampling performed by the circuit 800. In the case where downsampling is by a factor of 2, and the initial M×H DCT coefficient block is an 8×8 block, N would equal four.

Block 916 represents the N rows by L columns of pixel values generated by performing a 2-D combined IDCT/ downsampling operation using the circuits 700, 800 as illustrated in FIG. 9.

Figure 10:
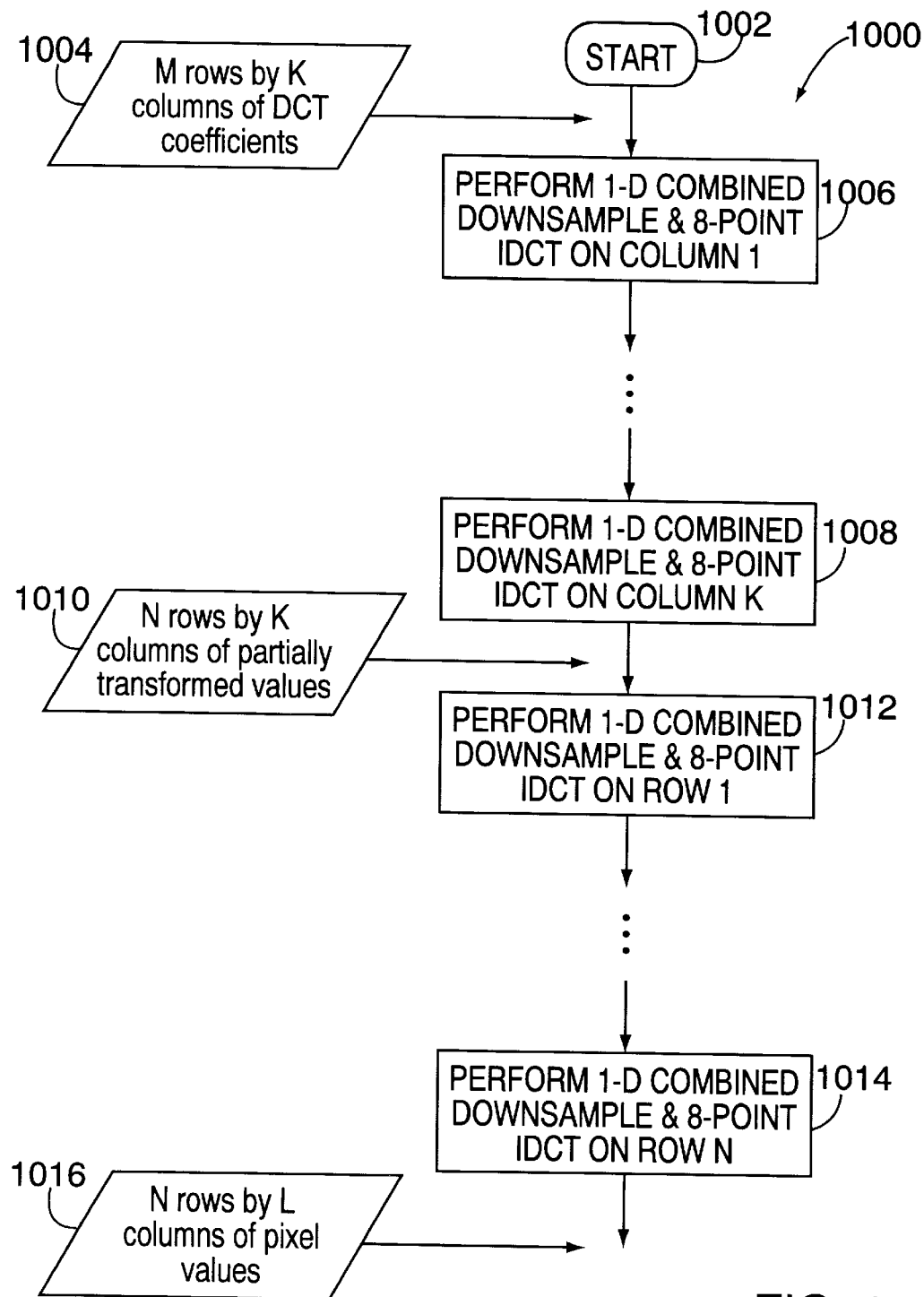

FIG. 10 illustrates a method 1000 of performing a 2-D combined IDCT/downsampling operation by performing column then row processing operations using the 1-D combined IDCT/downsampling circuits illustrated in FIGS. 7 and 8.

The method 1000 begins in step 1002. In step 1002 a block of B×H DCT coefficients to be processed is received and separated into M rows of K DCT coefficients per row. M may be equal to or less than B. Similarly, K may be equal to or less than H as discussed below.

The M×K set of DCT coefficients 1004 that are used (not treated as zero) are identified and divided into individual rows for processing as part of step 1002. In the case where the combined IDCT/downsampling circuits 700, 800 perform a full order IDCT operation all the coefficients in the received block of coefficients will be used. In such a case, if an 8×8 block of DCT coefficients is being processed, M and K will both equal 8.

In the case where the combined IDCT/downsampling circuits 700, 800 perform reduced complexity IDCT operations, some of the DCT coefficients in the received block of coefficients are treated as zero. Accordingly, in the case of reduced complexity combined IDCT/downsampling circuits, some of the coefficients in the rows and columns in the received block of B×H coefficients may be treated as zero. In such a case, M the number of coefficients used in each column and K, the number of coefficients used in each row, will be less than the number B of received coefficients in each column, and H, the number of received coefficients included in each row, respectively. In such an embodiment, M and K will be less than B and H, respectively.

Block 1004 represents the M rows of K DCT coefficients which are to be processed using the circuit 800. Each of the steps 1006–1008 correspond to the processing of one of the K columns of M DCT coefficients using the 1-D combined IDCT/downsampling circuit 800 implemented in accordance with the present invention. Note that for each one of the K columns of IDCT coefficients processed, N values, e.g., intermediate values, are generated. The group of N×K intermediate values generated in steps 1006–1008 are represented as block 1010. As discussed above, the number N of values generated for each column by the circuit 800 is a function of the downsampling performed by the circuit 800. For example, in the case of downsampling by a factor of 2, (N=8/2), 4 partial pixel values will be generated for each column.

Each one of the generated N rows of partial pixel values, including K values per row, of block 1010 are processed using the 1-D combined downsampling/IDCT circuit 700 to complete the 2-D IDCT/downsampling process in steps 1012, 1014. Each one of the N rows of intermediate values is separately processed by the circuit 700 to produce a set of L pixel values. In this case, L is a function of the downsampling performed by the circuit 700. In the case where downsampling is by a factor of 2, and the initial M×H DCT coefficient block is an 8×8 block, L would equal four.

Block 1016 represents the N rows by L columns of pixel values generated by performing a 2-D combined IDCT/ downsampling operation using the circuits 700, 800 as illustrated in FIG. 10.

Methods for implementing 1-D combined IDCT/ downsampling circuits 700, 800 in accordance with the present invention, will now be discussed in detail. The following discussion includes exemplary embodiments which are intended for use with progressively scanned video data and interlaced video data, respectively.

The mathematical formulation of the N-point, one-dimensional inverse discrete cosine transform (IDCT-II) is $$f_i = \sqrt{\frac{2}{N}} \sum_{j=0}^{N-1} C_j F_j \cos\left(\frac{(2i+1)j\pi}{2N}\right) \quad (1)$$

where $f_i$ are the inverse transform values with i=0, 1, 2, ..., N−1, $C_j$ is defined such that $$C_j = \begin{cases} \frac{1}{\sqrt{2}} & \text{for } j = 0 \\ 1 & \text{otherwise} \end{cases} \quad (2)$$

$F_j$ are the transform domain (DCT coefficient) values under process. As the inverse transform process can be viewed as a linear operation on the transform domain values equation (1) may be written in the equivalent form $$f = TF \quad (3)$$

where $$f = [f_0 \ f_1 \ \ldots \ f_{N-2} \ f_{N-1}]^t \quad (4)$$

is the column vector of inverse transform values, $$F = [F_0 \ F_1 \ \ldots \ F_{N-2} \ F_{N-1}]^t \quad (5)$$

is the column vector of transform domain values. The t denotes the matrix transpose. The operator T is an N-by-N matrix that represents the linear transformation in (1).

After defining the inverse discrete cosine transform the following situation is considered in which the inverse discrete cosine transform values, f, undergo further processing, e.g., downsampling. This post-processing is denoted by the linear operator P and the result is denoted by the vector G.

$$G = Pf = (PT)F \quad (6)$$

where $$G = [G_0 \ G_1 \ \ldots \ G_{K-2} \ G_{K-1}]^t \quad (7)$$

Where K is not necessarily equal to N and, in the case of downsampling will not be equal to N.

The operator P is a K-by-N matrix that performs some linear combinations of the N elements in f to produce the elements of G. The inventions of the present application recognize that in many cases, e.g., the case of sequential IDCT and downsampling operations, it is advantageous to implement the combination of PT simultaneously rather than performing the operations serially one after another. The problem of finding an efficient implementation of the combined inverse discrete cosine transform/linear operator process may be reduced to finding a factorization of the matrix S $$S = PT \quad (8)$$

Applying factorization in accordance with the present invention, for some P implementation based upon the factorization of S requires less than half the number of operations of the equivalent serial T followed by P implementation. The following exemplary embodiments show situations in which application of the combined processing and factorization techniques provide highly efficient implementations of 1-D combined IDCT/downsampling circuits for, e.g., progressively scanned images and for interlaced images. In the exemplary interlaced embodiment, downsampling is performed on a field, as opposed to frame, basis.

Following is a discussion of how to implement a 1-D IDCT operation combined with 2:1 decimation, e.g., downsampling by a factor of 2, on progressively scanned image data.

In this case the following specialization of the general case described by equation (8) above is assumed.

$$N = 8 \quad (9)$$

$$K = 4 \quad (10)$$

$$P = \frac{1}{2} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} \quad (11)$$

Combining the post-processing operator with the inverse discrete transform matrix in accordance with the present invention, the following results are obtained $$S = PT \quad (12)$$

$$= \frac{1}{4} \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}$$

$$\begin{bmatrix} W_4 & W_4 & W_4 & W_4 & W_4 & W_4 & W_4 & W_4 \\ W_1 & W_3 & W_5 & W_7 & -W_7 & -W_5 & -W_3 & -W_1 \\ W_2 & W_6 & -W_6 & -W_2 & -W_2 & -W_6 & W_6 & W_2 \\ W_3 & -W_7 & -W_1 & -W_5 & W_5 & W_1 & W_7 & W_3 \\ W_4 & -W_4 & -W_4 & W_4 & W_4 & -W_4 & -W_4 & W_4 \\ W_5 & -W_1 & W_7 & W_3 & -W_3 & -W_7 & W_1 & -W_5 \\ W_6 & -W_2 & W_2 & -W_6 & -W_6 & W_2 & -W_2 & W_6 \\ W_7 & -W_5 & W_3 & -W_1 & W_1 & -W_3 & W_5 & -W_7 \end{bmatrix}$$

where $$W_i = \cos\left(\frac{i\pi}{16}\right) \quad (13)$$

With some additional factoring and manipulation, the following equivalent form of S is obtained.

$$S = \frac{1}{2} \begin{bmatrix} W_4 & W_2 & W_4 & W_6 & 0 & -W_6 & -W_4 & -W_2 \\ W_4 & W_6 & -W_4 & -W_2 & 0 & W_2 & W_4 & -W_6 \\ W_4 & -W_6 & -W_4 & W_2 & 0 & -W_2 & W_4 & W_6 \\ W_4 & -W_2 & W_4 & -W_6 & 0 & W_6 & -W_4 & W_2 \end{bmatrix} \quad (14)$$

$$\begin{bmatrix} 1 & 0 & 0 & 0 & 0 & 0 & 0 & 0 \\ 0 & W_1 & 0 & 0 & 0 & 0 & 0 & 0 \\ 0 & 0 & W_2 & 0 & 0 & 0 & 0 & 0 \\ 0 & 0 & 0 & W_3 & 0 & 0 & 0 & 0 \\ 0 & 0 & 0 & 0 & W_4 & 0 & 0 & 0 \\ 0 & 0 & 0 & 0 & 0 & W_5 & 0 & 0 \\ 0 & 0 & 0 & 0 & 0 & 0 & W_6 & 0 \\ 0 & 0 & 0 & 0 & 0 & 0 & 0 & W_7 \end{bmatrix}$$

It is possible to factorize the left, 4-by-8, matrix to obtain the following form. This factorized form may be manipulated to obtain matrices that contain far fewer multiplications than the original.

$$S = \frac{1}{2}\begin{bmatrix} W_4 & W_2 & W_4 & W_6 \\ W_4 & W_6 & -W_4 & -W_2 \\ W_4 & -W_6 & -W_4 & W_2 \\ W_4 & -W_2 & W_4 & -W_6 \end{bmatrix}\begin{bmatrix} 1 & 0 & 0 & 0 & 0 & 0 & 0 & 0 \\ 0 & 1 & 0 & 0 & 0 & 0 & 0 & -1 \\ 0 & 0 & 1 & 0 & 0 & 0 & -1 & 0 \\ 0 & 0 & 0 & 1 & 0 & -1 & 0 & 0 \end{bmatrix} \quad (15)$$

$$\begin{bmatrix} 1 & 0 & 0 & 0 & 0 & 0 & 0 & 0 \\ 0 & W_1 & 0 & 0 & 0 & 0 & 0 & 0 \\ 0 & 0 & W_2 & 0 & 0 & 0 & 0 & 0 \\ 0 & 0 & 0 & W_3 & 0 & 0 & 0 & 0 \\ 0 & 0 & 0 & 0 & W_4 & 0 & 0 & 0 \\ 0 & 0 & 0 & 0 & 0 & W_5 & 0 & 0 \\ 0 & 0 & 0 & 0 & 0 & 0 & W_6 & 0 \\ 0 & 0 & 0 & 0 & 0 & 0 & 0 & W_7 \end{bmatrix} =$$

$$\frac{1}{2}\begin{bmatrix} 1 & \frac{W_2}{W_6} & 1 & 1 \\ 1 & 1 & -1 & -\frac{W_2}{W_6} \\ 1 & -1 & -1 & \frac{W_2}{W_6} \\ 1 & -\frac{W_2}{W_6} & 1 & -1 \end{bmatrix}$$

$$\begin{bmatrix} W_4 & 0 & 0 & 0 & 0 & 0 & 0 & 0 \\ 0 & W_6 & 0 & 0 & 0 & 0 & 0 & -W_6 \\ 0 & 0 & W_4 & 0 & 0 & 0 & -W_4 & 0 \\ 0 & 0 & 0 & W_6 & 0 & -W_6 & 0 & 0 \end{bmatrix} \times$$

$$\begin{bmatrix} 1 & 0 & 0 & 0 & 0 & 0 & 0 & 0 \\ 0 & W_1 & 0 & 0 & 0 & 0 & 0 & 0 \\ 0 & 0 & W_2 & 0 & 0 & 0 & 0 & 0 \\ 0 & 0 & 0 & W_3 & 0 & 0 & 0 & 0 \\ 0 & 0 & 0 & 0 & W_4 & 0 & 0 & 0 \\ 0 & 0 & 0 & 0 & 0 & W_5 & 0 & 0 \\ 0 & 0 & 0 & 0 & 0 & 0 & W_6 & 0 \\ 0 & 0 & 0 & 0 & 0 & 0 & 0 & W_7 \end{bmatrix}$$

After moving the factors that are present in the middle matrix into the end the following form is obtained.

$$S = \frac{1}{2}\begin{bmatrix} 1 & \frac{W_2}{W_6} & 1 & 1 \\ 1 & 1 & -1 & -\frac{W_2}{W_6} \\ 1 & -1 & -1 & \frac{W_2}{W_6} \\ 1 & -\frac{W_2}{W_6} & 1 & -1 \end{bmatrix}\begin{bmatrix} 1 & 0 & 0 & 0 & 0 & 0 & 0 & 0 \\ 0 & 1 & 0 & 0 & 0 & 0 & 0 & -1 \\ 0 & 0 & 1 & 0 & 0 & 0 & -1 & 0 \\ 0 & 0 & 0 & 1 & 0 & -1 & 0 & 0 \end{bmatrix} \times \quad (16)$$

$$\begin{bmatrix} W_4 & 0 & 0 & 0 & 0 & 0 & 0 & 0 \\ 0 & W_6W_1 & 0 & 0 & 0 & 0 & 0 & 0 \\ 0 & 0 & W_4W_2 & 0 & 0 & 0 & 0 & 0 \\ 0 & 0 & 0 & W_6W_3 & 0 & 0 & 0 & 0 \\ 0 & 0 & 0 & 0 & 0 & 0 & 0 & 0 \\ 0 & 0 & 0 & 0 & 0 & W_6W_5 & 0 & 0 \\ 0 & 0 & 0 & 0 & 0 & 0 & W_4W_6 & 0 \\ 0 & 0 & 0 & 0 & 0 & 0 & 0 & W_6W_7 \end{bmatrix}$$

Equation 16 is a mathematical representation of a combined 1-D IDCT and decimation operation implemented in accordance with the present invention through the use of, e.g., the CPU of a general purpose computer or as a physical hardware circuit. Note that equation (16) is equivalent to equation (12) but requires much less hardware to implement than equation 12.

The combined downsampling/inverse discrete cosine transform operation of the present invention set forth in (16) can, and in one embodiment is, implemented using only nine multipliers and 15 adders to perform 9 multiplications and 15 additions, respectively. This number of multipliers and adders is in sharp contrast to known systems which involve sequential IDCT and downsampling operations that require, e.g., 56 multiplications and 60 additions, to achieve the same processing result.

For a better comparison of the computational complexity of the above discussed embodiment and known IDCT/downsampling devices, consider that a known efficient 1-by-8 inverse discrete cosine transform device requires 11 multiplications and 29 additions. To perform the averaging shown in equation (11), 4more additions are necessary, bringing the total number of multiplications and additions to 11 multiplications and 33 additions.

Thus it is shown that the combined implementation of downsampling and the inverse discrete cosine transform in accordance with the above described embodiment of the present invention requires far fewer multiplications and additions than the known, sequentially performed, efficient direct implementations of equivalent IDCT and downsampling operations.

In a video decoder, further overall computational efficiency may be achieved in accordance with the present invention, if the 8-by-8 matrix used in performing the combined IDCT/downsampling operation is absorbed into the inverse quantization stage of the decoder.

The above discussed example of performing a 1-D combined IDCT/downsampling operation with 2:1 decimation assumes that a full order IDCT is performed using all of the input DCT coefficients. In applications where reduced complexity video decoding is employed, it will be known a priori that some of the coefficients can always be treated as having the value zero. This case allows even further reduction of computation. For instance, if $F_4=F_5=F_6=F_7=0$, then the input vector can be truncated to the first four elements, the 8-by-8 matrix used to perform the IDCT/downsampling operation can be reduced to the upper left quadrant, and the 4-by-8 matrix can be reduced to the left half, saving three multiplications and three additions. Thus, a reduced order 1-D combined IDCT/downsampling operation involving decimation by a factor of 2, can be implemented in accordance with the present invention using the following equation:

$$S = \frac{1}{2}\begin{bmatrix} 1 & \frac{W_2}{W_6} & 1 & 1 \\ 1 & 1 & -1 & -\frac{W_2}{W_6} \\ 1 & -1 & -1 & \frac{W_2}{W_6} \\ 1 & -\frac{W_2}{W_6} & 1 & -1 \end{bmatrix} \times \begin{bmatrix} W_4 & 0 & 0 & 0 \\ 0 & W_6 W_1 & 0 & 0 \\ 0 & 0 & W_4 W_2 & 0 \\ 0 & 0 & 0 & W_6 W_3 \end{bmatrix}$$ (16.1)

Use of the present invention to perform a combined IDCT/downsampling operation employing vertical 2:1 decimation on data representing an interlaced image will now be discussed. In accordance with various embodiments of the present invention vertical decimation of interlaced images is performed on a field as opposed to frame basis. That is, alternating rows of image data belonging to different fields of an image are downsampled separately. During horizontal image processing no distinction between field and frame based images is made for downsampling purposes. Thus, in one embodiment of the present invention vertical decimation of images is performed in the DCT domain on a field basis using a first set of 1-D combined IDCT/downsampling circuits while horizontal (row) processing is performed on a field basis using 1-D IDCT circuits of the type discussed above in regard to the progressive picture refresh embodiment.

By performing vertical decimation on a field basis in the DCT domain, the implementation efficiencies achieved in accordance with the present invention are obtained without suffering the blurring and other image distortions that result when interlaced images are downsampled on a frame basis and pixel data from two different fields is combined.

A method of performing a combined IDCT/downsampling operation with 2:1 decimation on interlaced image data representing a vertical portion of an interlaced image will now be discussed in detail.

The representation of interlaced image data is somewhat different to that for progressive image data. In the MPEG-2 video standard, provision is made for the representation of interlaced video. In the interlaced, frame DCT mode the vector of IDCT values $f=[f_0\ f_1\ f_2\ f_3\ f_4\ f_5\ f_6\ f_7]^t$ may be considered to have a special form. That is, the components $f_0\ f_2\ f_4\ f_6$, are vertical samples from one of the fields (either even or odd) and the components $f_1\ f_3\ f_5\ f_7$, are vertical samples from the opposite field.

With this in mind, the following specialization of the general case in equation (8) described above is assumed for processing vertical portions of interlaced images and downsampling by a factor of 2.

N=8 (17)

K=4 (18)

$$P = \frac{1}{2}\begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}$$ (19)

The post-processing matrix (19) has been designed so that the decimated values contain influences from only odd or even lines but not both. Thus an odd decimated value contains influences from only the odd components of f and an even decimated value contains influences from only the even components on f. Combining the post-processing operator with the inverse discrete transform matrix the following results are obtained.

$$S = PT = \frac{1}{4}\begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 1 & 0 & 1 & 0 \\ 0 & 0 & 0 & 0 & 0 & 1 & 0 & 1 \end{bmatrix}$$ (20)

$$\begin{bmatrix} W_4 & W_4 & W_4 & W_4 & W_4 & W_4 & W_4 & W_4 \\ W_1 & W_3 & W_5 & W_7 & -W_7 & -W_5 & -W_3 & -W_1 \\ W_2 & W_6 & -W_6 & -W_2 & -W_2 & -W_6 & W_6 & W_2 \\ W_3 & -W_7 & -W_1 & -W_5 & W_5 & W_1 & W_7 & W_3 \\ W_4 & -W_4 & -W_4 & W_4 & W_4 & -W_4 & -W_4 & W_4 \\ W_5 & -W_1 & W_7 & W_3 & -W_3 & -W_7 & W_1 & -W_5 \\ W_6 & -W_2 & W_2 & -W_6 & -W_6 & W_2 & -W_2 & W_6 \\ W_7 & -W_5 & W_3 & -W_1 & W_1 & -W_3 & W_5 & -W_7 \end{bmatrix}$$

where the $W_i$'s are defined as in (13)

$$S = \frac{1}{2}\begin{bmatrix} W_4 & W_3 & W_6 & -W_7 & -W_4 & -W_1 & -W_2 & -W_5 \\ W_4 & W_5 & -W_6 & -W_1 & -W_4 & W_7 & W_2 & W_3 \\ W_4 & -W_5 & -W_6 & W_1 & -W_4 & -W_7 & W_2 & -W_3 \\ W_4 & -W_3 & W_6 & W_7 & -W_4 & W_1 & -W_2 & W_5 \end{bmatrix} \times$$ (21)

$$\begin{bmatrix} 1 & 0 & 0 & 0 & 0 & 0 & 0 & 0 \\ 0 & W_2 & 0 & 0 & 0 & 0 & 0 & 0 \\ 0 & 0 & W_4 & 0 & 0 & 0 & 0 & 0 \\ 0 & 0 & 0 & W_6 & 0 & 0 & 0 & 0 \\ 0 & 0 & 0 & 0 & W_8 & 0 & 0 & 0 \\ 0 & 0 & 0 & 0 & 0 & W_{10} & 0 & 0 \\ 0 & 0 & 0 & 0 & 0 & 0 & W_{12} & 0 \\ 0 & 0 & 0 & 0 & 0 & 0 & 0 & W_{14} \end{bmatrix}$$

In order to exploit some of the similarities that exist among the columns of the left most matrix it is convenient to introduce a permutation.

$$S = \frac{1}{2}\begin{bmatrix} W_4 & -W_4 & W_3 & -W_5 & -W_7 & -W_1 & W_6 & -W_2 \\ W_4 & -W_4 & W_5 & W_3 & -W_1 & W_7 & -W_6 & W_2 \\ W_4 & -W_4 & -W_5 & -W_3 & W_1 & -W_7 & -W_6 & W_2 \\ W_4 & -W_4 & -W_3 & W_5 & W_7 & W_1 & W_6 & -W_2 \end{bmatrix} \times$$ (22)

$$\begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \end{bmatrix}$$

$$\begin{bmatrix} 1 & 0 & 0 & 0 & 0 & 0 & 0 & 0 \\ 0 & W_2 & 0 & 0 & 0 & 0 & 0 & 0 \\ 0 & 0 & W_4 & 0 & 0 & 0 & 0 & 0 \\ 0 & 0 & 0 & W_6 & 0 & 0 & 0 & 0 \\ 0 & 0 & 0 & 0 & W_8 & 0 & 0 & 0 \\ 0 & 0 & 0 & 0 & 0 & W_{10} & 0 & 0 \\ 0 & 0 & 0 & 0 & 0 & 0 & W_{12} & 0 \\ 0 & 0 & 0 & 0 & 0 & 0 & 0 & W_{14} \end{bmatrix}$$

Once in this form it is possible to factorize the left-most matrix to obtain:

$$S = \frac{1}{2}\begin{bmatrix} 1 & 0 & 0 & -1 \\ 0 & 1 & -1 & 0 \\ 0 & 1 & 1 & 0 \\ 1 & 0 & 0 & 1 \end{bmatrix} \quad (23)$$

$$\begin{bmatrix} W_4 & -W_4 & 0 & 0 & 0 & 0 & W_6 & -W_2 \\ W_4 & -W_4 & 0 & 0 & 0 & 0 & -W_6 & W_2 \\ 0 & 0 & -W_5 & -W_3 & W_1 & -W_7 & 0 & 0 \\ 0 & 0 & -W_3 & W_5 & W_7 & W_1 & 0 & 0 \end{bmatrix} \times$$

$$\begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \end{bmatrix}$$

$$\begin{bmatrix} 1 & 0 & 0 & 0 & 0 & 0 & 0 & 0 \\ 0 & W_2 & 0 & 0 & 0 & 0 & 0 & 0 \\ 0 & 0 & W_4 & 0 & 0 & 0 & 0 & 0 \\ 0 & 0 & 0 & W_6 & 0 & 0 & 0 & 0 \\ 0 & 0 & 0 & 0 & W_8 & 0 & 0 & 0 \\ 0 & 0 & 0 & 0 & 0 & W_{10} & 0 & 0 \\ 0 & 0 & 0 & 0 & 0 & 0 & W_{12} & 0 \\ 0 & 0 & 0 & 0 & 0 & 0 & 0 & W_{14} \end{bmatrix} =$$

$$\frac{1}{2}\begin{bmatrix} 1 & 0 & 0 & -1 \\ 0 & 1 & -1 & 0 \\ 0 & 1 & 1 & 0 \\ 1 & 0 & 0 & 1 \end{bmatrix}$$

$$\begin{bmatrix} 1 & -1 & 0 & 0 & 0 & 0 & 1 & -1 \\ 1 & -1 & 0 & 0 & 0 & 0 & -1 & 1 \\ 0 & 0 & -\dfrac{W_5}{W_3} & -1 & 1 & -\dfrac{W_7}{W_1} & 0 & 0 \\ 0 & 0 & -1 & \dfrac{W_5}{W_3} & \dfrac{W_7}{W_1} & 1 & 0 & 0 \end{bmatrix} \times$$

$$\begin{bmatrix} W_4 & 0 & 0 & 0 & 0 & 0 & 0 \\ 0 & 0 & 0 & 0 & W_4 & 0 & 0 \\ 0 & W_3 & 0 & 0 & 0 & 0 & 0 \\ 0 & 0 & 0 & 0 & 0 & 0 & W_3 \\ 0 & 0 & 0 & W_1 & 0 & 0 & 0 \\ 0 & 0 & 0 & 0 & 0 & W_1 & 0 \\ 0 & 0 & W_6 & 0 & 0 & 0 & 0 \\ 0 & 0 & 0 & 0 & 0 & 0 & W_2 & 0 \end{bmatrix}$$

$$\begin{bmatrix} 1 & 0 & 0 & 0 & 0 & 0 & 0 & 0 \\ 0 & W_2 & 0 & 0 & 0 & 0 & 0 & 0 \\ 0 & 0 & W_4 & 0 & 0 & 0 & 0 & 0 \\ 0 & 0 & 0 & W_6 & 0 & 0 & 0 & 0 \\ 0 & 0 & 0 & 0 & W_8 & 0 & 0 & 0 \\ 0 & 0 & 0 & 0 & 0 & W_{10} & 0 & 0 \\ 0 & 0 & 0 & 0 & 0 & 0 & W_{12} & 0 \\ 0 & 0 & 0 & 0 & 0 & 0 & 0 & W_{14} \end{bmatrix}$$

After moving the factors that are present in the middle matrix into the end the following form is obtained.

$$S = \frac{1}{2}\begin{bmatrix} 1 & 0 & 0 & -1 \\ 0 & 1 & -1 & 0 \\ 0 & 1 & 1 & 0 \\ 1 & 0 & 0 & 1 \end{bmatrix}\begin{bmatrix} 1 & 0 & 0 & 0 & 0 & 0 & 1 & -1 \\ 1 & 0 & 0 & 0 & 0 & 0 & -1 & 1 \\ 0 & 0 & -\frac{W_5}{W_3} & -1 & 1 & -\frac{W_7}{W_1} & 0 & 0 \\ 0 & 0 & -1 & \frac{W_5}{W_3} & \frac{W_7}{W_1} & 1 & 0 & 0 \end{bmatrix} \times \qquad (24)$$

$$\begin{bmatrix} 1 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 0 & 1 \\ 0 & 0 & 0 & 1 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \end{bmatrix}$$

$$\begin{bmatrix} W_4 & 0 & 0 & 0 & 0 & 0 & 0 & 0 \\ 0 & W_3W_2 & 0 & 0 & 0 & 0 & 0 & 0 \\ 0 & 0 & W_6W_4 & 0 & 0 & 0 & 0 & 0 \\ 0 & 0 & 0 & W_1W_6 & 0 & 0 & 0 & 0 \\ 0 & 0 & 0 & 0 & 0 & 0 & 0 & 0 \\ 0 & 0 & 0 & 0 & 0 & W_1W_{10} & 0 & 0 \\ 0 & 0 & 0 & 0 & 0 & 0 & W_2W_{12} & 0 \\ 0 & 0 & 0 & 0 & 0 & 0 & 0 & W_3W_{14} \end{bmatrix}$$

Equation (24) is equivalent to equation (20). However, in accordance with the present invention, the downsampling inverse discrete cosine transform for interlaced data is implemented using only 11 multiplications and 14 additions whereas the direct form requires 56 multiplications and 60 additions. For a better comparison of the computational complexity, consider that a known efficient 1-by-8 inverse discrete cosine transform known requires 11 multiplications and 29 additions. To perform the averaging shown in equation (19), 4 more additions are necessary—bringing the total to 11 multiplications and 33 additions. Thus it is shown that the combined implementation of downsampling and the inverse discrete cosine transform requires fewer multiplications and additions than a known efficient direct implementation involving separate sequential IDCT/downsampling operations.

Further computational reduction may be achieved if the 8-by-8 matrix is absorbed into the inverse quantization stage—in this case only 4 multiplications and 16 additions are required. This is considerably more efficient than the direct implementation. Also, in some applications involving reduced complexity video decoding, it may be known a priori that some of the coefficients can always be treated as having the value zero. This case allows even further reduction of computation. For instance, if $F_2=F_3=F_4=F_5=0$, then the input vector and computation matrices can be reduced in a similar manner as above, thus further reducing the number of multiplication and addition operations.

Flow diagrams 11 and 12 are illustrative of additional exemplary embodiments of the combined IDCT/downsampling methods and apparatus of the present invention.

In FIGS. 11 and 12, circles are used to represent operators, e.g., hardware multipliers and adders, which comprise combined IDCT/downsampling circuits implemented in accordance with the present invention. Arrows are used to indicate the flow of data between circuit components, e.g., via existing hardware connections. + and − signs next to arrows are used to indicate whether the value corresponding to the path should be added or subtracted by the corresponding adder to which the arrows are connected to generate the output of the adder.

FIG. 11 illustrates a 1-D reduced complexity combined 8-point IDCT/downsampling operation which performs decimation on a frame basis by a factor of 2. It is suitable for use when, e.g., processing progressively scanned image data. Note that in the FIG. 11 embodiment only the first four DCT coefficients of a set of 8 DCT coefficients representing a row or column of 8 pixels are used. Note also that the values of the remaining four coefficients are treated as zero to implement inexpensive low pass filtering in the DCT domain. As a result of downsampling, 4 pixel values are generated f0, f1, f2, f3 as a result of the combined IDCT/downsampling operation illustrated in FIG. 11.

As illustrated in FIG. 11 a reduced complexity 1-D combined IDCT/downsampling circuit may comprise 6 multipliers 1102, 1104, 1106, 1108, 1010 and 1112 which apply a gain of D0, D1, D2, D3, B, B to the values input thereto, respectively. Each of a first set of four summers 1114, 1116, 1118 and 1120 receive their inputs from the outputs of two different ones of the 6 multipliers and generate therefrom a first set of summer output signals. A second set of summers 1122, 1124, 1126, 1128 receive their inputs from the illustrated outputs of different pairs of summers included in the first set of summers 1114, 1116, 1118 and 1120. The first through fourth summers 1122, 1124, 1126 and 1128 generate the first through fourth pixel values f0, f1, f2, f3, respectively.

By following the path of arrows in the reverse direction from the f0 output of the first summer 1122 of the second set of summers, it can be seen that in the FIG. 11 embodiment, the first pixel value f0 is generated as the sum of the outputs of the first and second summers 1114, 1116, of the first set of summers.

In addition, it can be seen that the output of the first summer 1114, of the first set of summers, is generated by adding the output of the first multiplier 1102 to the output of the third multiplier 1106. The output of the first and third multipliers 1102, 1106 are generated by multiplying the first and third DCT coefficients F0, F2, by the values D0, D2, respectively.

From a review of FIG. 11, it can also be seen that the output of the second summer 1116, of the first set of summers, is generated by adding the output of the second multiplier 1104 to the output of the fifth multiplier 1110. The output of the fifth multiplier 1110 is obtained by multiplying the output of the fourth multiplier 1108 by the value B. The outputs of the second and fourth multipliers 1104, 1108 are obtained by multiplying the second and fourth input DCT coefficient values F1, F3 by the values D1 and D3 respectively.

Having discussed how the flow diagram of FIG. 11 illustrates the generation of the first pixel value f0 in detail, it becomes clear that the flow diagram illustrates how each of the four output pixel values f0, f1, f2, f3 is generated from the input DCT values.

The flow diagram of FIG. 12 is similar to that of FIG. 8. However, the flow diagram of FIG. 12 illustrates how a reduced complexity 1-D combined IDCT/downsampling operation which involves decimation by a factor of 2 is implemented in one embodiment for the processing of vertical interlaced image data. Note that in the FIG. 12 embodiment only the first two (F0, F1) and last two (F7,F8) DCT coefficients of a set of 8 DCT coefficients representing a column of 8 pixels is used. Note also that the values of the remaining four coefficients are treated as zero. As a result of downsampling, 4 pixel values are generated f0, f1, f2, f3 as a result of the combined IDCT/downsampling operation illustrated in FIG. 12. Unlike the case illustrated in the FIG. 11 embodiment, in the FIG. 12 embodiment odd and even rows of pixel data are downsampled separately to achieve field based downsampling.

As illustrated in FIG. 12 a reduced complexity 1-D combined IDCT/downsampling circuit may comprise 6 multipliers 1202, 1204, 1206, 1208, 1210 and 1212 which apply a gain of E0, E1, E2, E3, C, C to the values input thereto, respectively. Each of a first set of four summers 1214, 1216, 1218 and 1220 receive their inputs from the outputs of two different ones of the 6 multipliers and generate therefrom a first set of summer output signals. A second set of summers 1222, 1224, 1226, 1228 receive their inputs from the illustrated outputs of different pairs of summers included in the first set of summers 1214, 1216, 1218 and 1220. The first through fourth summers 1222, 1224, 1226 and 1228, in the second set of summers, generate the first through fourth pixel values f0, f1, f2, f3, respectively.

It is to be understood that the methods of the present invention can be implemented using software and a CPU of a general purpose computer as well as in hardware circuits such as those used in dedicated video decoder circuits.

What is claimed is:

1. A method of processing a set of transform coded data representing an image at a first resolution, comprising the steps of:

performing an inverse discrete cosine transform operation and a downsampling operation on each one of a plurality of rows of DCT coefficients to generate a set of partially transformed data including columns of values; and performing an inverse discrete cosine transform operation and a downsampling operation on at least some of said columns of values to generate a set of pixel values representing the image in the pixel domain at a second resolution which is lower than the first resolution.

2. The method of claim 1, wherein the step of performing an inverse discrete cosine transform operation and a downsampling operation on each one of a plurality of rows of DCT coefficients includes the step of:

using a combined one dimensional inverse discrete cosine transform and downsampling circuit to process at least one row of discrete cosine transform coefficients.

3. The method of claim 2, wherein the step of performing an inverse discrete cosine transform operation and a downsampling operation on at least some of said columns of values includes the step of:

using a combined one dimensional inverse discrete cosine transform and downsampling circuit to process at least one column of values.

4. A method of processing a set of transform coded data representing an image at a first resolution, comprising the steps of:

performing an inverse discrete cosine transform operation and a downsampling operation on each one of a plurality of rows of DCT coefficients to generate a set of partially transformed data including columns of values;

performing an inverse discrete cosine transform operation and a downsampling operation on at least some of said columns of values to generate a set of pixel values representing the image in the pixel domain at a second resolution which is lower than the first resolution;

said set of transform coded data representing the image being a block of M×N DCT coefficients which is equal in size to a full block of DCT coefficients generated by performing a discrete cosine transform operation when data representing the image was originally coded using a discrete cosine transform coding process; and said plurality of rows of DCT coefficients which are processed including the full M number of rows of DCT coefficients included in the block of DCT coefficients.

5. The method of claim 4, wherein the method further comprises the step of:

treating some of the coefficients in at least some of the M rows of DCT coefficients as having a value of zero.

6. The method of claim 5, wherein the coefficients which are treated as having a value of zero are non-contiguous coefficients within a row of coefficients.

7. A method of processing a set of transform coded data representing an image at a first resolution, comprising the steps of:

performing an inverse discrete cosine transform operation and a downsampling operation on each one of a plurality of rows of DCT coefficients to generate a set of partially transformed data including columns of values;

performing an inverse discrete cosine transform operation and a downsampling operation on at least some of said columns of values to generate a set of pixel values representing the image in the pixel domain at a second resolution which is lower than the first resolution;

said set of transform coded data representing the image in a progressive image format corresponding to at least two image fields; and wherein downsampling is performed separately on the data corresponding to each of the image fields when processing at least one of the said columns of values.

8. The method of claim 7, wherein the downsampling performed when processing at least one of the plurality of rows of DCT coefficients is performed without regard to the image field to which the data corresponds.

9. The method of claim 8, further comprising the step of:
using the set of pixel values to generate the image on a display device.

10. A method of processing a set of transform coded data representing an image at a first resolution, comprising the steps of:
performing an inverse discrete cosine transform operation and a downsampling operation on each one of a plurality of columns of DCT coefficients to generate a set of partially transformed data including rows of values; and
performing an inverse discrete cosine transform operation and a downsampling operation on at least some of said rows of values to generate a set of pixel values representing the image in the pixel domain at a second resolution which is lower than the first resolution.

11. The method of claim 10, wherein the step of performing an inverse discrete cosine transform operation and a downsampling operation on each one of a plurality of columns of DCT coefficients includes the step of:
using a combined one dimensional inverse discrete cosine transform and downsampling circuit to process at least one column of discrete cosine transform coefficients.

12. The method of claim 11, wherein the step of performing an inverse discrete cosine transform operation and a downsampling operation on at least some of said rows of values to generate a set of pixel values includes the step of:
using a combined one dimensional inverse discrete cosine transform and downsampling circuit to process at least one of said rows of values.

13. A method of processing a set of transform coded data representing an image at a first resolution, comprising the steps of:
performing an inverse discrete cosine transform operation and a downsampling operation on each one of a plurality of columns of DCT coefficients to generate a set of partially transformed data including rows of values;
performing an inverse discrete cosine transform operation and a downsampling operation on at least some of said rows of values to generate a set of pixel values representing the image in the pixel domain at a second resolution which is lower than the first resolution;
said set of transform coded data representing the image is a block of M×N DCT coefficients which is equal in size to the block of DCT coefficients generated by performing a discrete cosine transform operation when data representing the image was originally coded using a discrete cosine transform coding process; and
said plurality of columns of DCT coefficients which are processed including the full N number of columns of DCT coefficients included in the block of DCT coefficients, where M and N are positive integers.

14. The method of claim 13, wherein the method further comprises the step of:
treating some of the coefficients in at least some of the N columns of DCT coefficients as having a value of zero.

15. The method of claim 14, wherein the coefficients which are treated as having a value of zero are non-contiguous coefficients within a column of coefficients.

16. A method of processing a set of transform coded data representing an image at a first resolution, comprising the steps of:
performing an inverse discrete cosine transform operation and a downsampling operation on each one of a plurality of columns of DCT coefficients to generate a set of partially transformed data including rows of values;
performing an inverse discrete cosine transform operation and a downsampling operation on at least some of said rows of values to generate a set of pixel values representing the image in the pixel domain at a second resolution which is lower than the first resolution;
said set of transform coded data representing the image in a progressive image format corresponding to at least two image fields; and
said downsampling being performed separately on the data corresponding to each of the image fields when processing at least one of said columns of values.

17. The method of claim 16,
wherein the downsampling performed when processing at least one of said rows of values is performed without regard to the image field to which the data corresponds.

18. The method of claim 17, further comprising the step of:
using the set of pixel values to generate the image on a display device.

19. An apparatus for processing a set of discrete cosine transform coefficients representing an image, the apparatus comprising:
a first plurality of circuits for performing a one dimensional combined IDCT/downsampling operation on rows of DCT coefficients; and
a second plurality of circuits for performing a one dimensional combined IDCT/downsampling operation on columns of values generated by the first plurality of circuits.

20. An apparatus for processing a set of discrete cosine transform coefficients representing an image, the apparatus comprising:
a first plurality of circuits for performing a one dimensional combined IDCT/downsampling operation on rows of DCT coefficients; and
a second plurality of circuits for performing a one dimensional combined IDCT/downsampling operation on columns of values generated by the first plurality of circuits, said second plurality of circuits performing downsampling on a field basis when processing data representing an image corresponding to two interleaved image fields.

21. An apparatus for processing a set of discrete cosine transform coefficients representing an image, the apparatus comprising:
a first plurality of circuits for performing a one dimensional combined IDCT/downsampling operation on columns of DCT coefficients; and
a second plurality of circuits for performing a one dimensional combined IDCT/downsampling operation on rows of values generated by the first plurality of circuits.

* * * * *